(12) United States Patent
Zhang et al.

(10) Patent No.: US 12,482,905 B2
(45) Date of Patent: Nov. 25, 2025

(54) LAYER-BUILT TAB, ELECTRODE PLATE, BATTERY CORE, AND BATTERY USING SAME

(71) Applicant: Ningde Amperex Technology Limited, Ningde (CN)

(72) Inventors: Jiaxi Zhang, Ningde (CN); Shasha Wang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 660 days.

(21) Appl. No.: 17/581,063

(22) Filed: Jan. 21, 2022

(65) Prior Publication Data

US 2022/0149492 A1 May 12, 2022

Related U.S. Application Data

(63) Continuation of application No. PCT/CN2020/078847, filed on Mar. 11, 2020.

(30) Foreign Application Priority Data

Jul. 22, 2019 (CN) .......................... 201921155055.4

(51) Int. Cl.
*H01M 50/534* (2021.01)
*H01M 50/533* (2021.01)
*H01M 50/538* (2021.01)

(52) U.S. Cl.
CPC ....... *H01M 50/534* (2021.01); *H01M 50/533* (2021.01); *H01M 50/538* (2021.01)

(58) Field of Classification Search
CPC . H01M 50/534; H01M 50/538; H01M 50/533
See application file for complete search history.

(56) References Cited

U.S. PATENT DOCUMENTS

2004/0043289 A1* 3/2004 Shimamura ......... H01M 50/562
429/153
2011/0052969 A1 3/2011 Cai et al.
(Continued)

FOREIGN PATENT DOCUMENTS

| CN | 202495509 U | 10/2012 |
| CN | 203690396 U | 7/2014 |
| CN | 204375833 U | 6/2015 |

(Continued)

OTHER PUBLICATIONS

International Search Report for International Application PCT/CN2020/078847 mailed May 27, 2020.
(Continued)

*Primary Examiner* — Brian R Ohara
*Assistant Examiner* — Emily Elizabeth Freeman
(74) *Attorney, Agent, or Firm* — Maier & Maier, PLLC

(57) ABSTRACT

The present application provides a layer-built tab, which includes a plurality of metal pieces and adhesives, the metal pieces being stacked and bonded by the adhesives. The metal pieces are stacked and spaced apart from each other, which increases the heat dissipation area of the tab while supporting a large current flow, the heat dissipation capability of the tab is improved. An electrode plate, a battery core, and a battery including the layer-built tab are also disclosed.

14 Claims, 9 Drawing Sheets

(56) References Cited

U.S. PATENT DOCUMENTS

2014/0349181 A1* 11/2014 Lim ................... H01M 50/46
                                                                        429/211
2017/0069929 A1* 3/2017 Kim ................... H01M 50/538

FOREIGN PATENT DOCUMENTS

| CN | 204680718 U |   | 9/2015 |
|---|---|---|---|
| CN | 105024033 A |   | 11/2015 |
| CN | 105489826 A |   | 4/2016 |
| CN | 206134801 U |   | 4/2017 |
| CN | 109585908 A | * | 4/2019 |
| JP | 2011108469 A |   | 6/2011 |
| JP | 2016526262 A |   | 9/2016 |
| KR | 20030066960 A |   | 8/2003 |
| KR | 20110137639 A |   | 12/2011 |
| KR | 20170058171 A |   | 5/2017 |

OTHER PUBLICATIONS

Extended European Search Report mailed Feb. 24, 2021.
Korean Office Action of Nov. 30, 2021.
Yang Xuerui et al. "Enabling Stable High-Voltage LiCoO(2) Operation by Using Synergetic Interfacial Modification Strategy" Advanced Functional Materials, vol. 20, #43, Sep. 3, 2020, p. 2004664(1-12).
Farhat D, Maibach J, Eriksson H et al. "Towards high-voltage Li-ion batteries: Reversible cycling of graphite anodes and Li-ion batteries in adiponitrile-based electrolytes" Electrochimica Acta, vol. 281, Aug. 10, 2018, pp. 299-311.

* cited by examiner

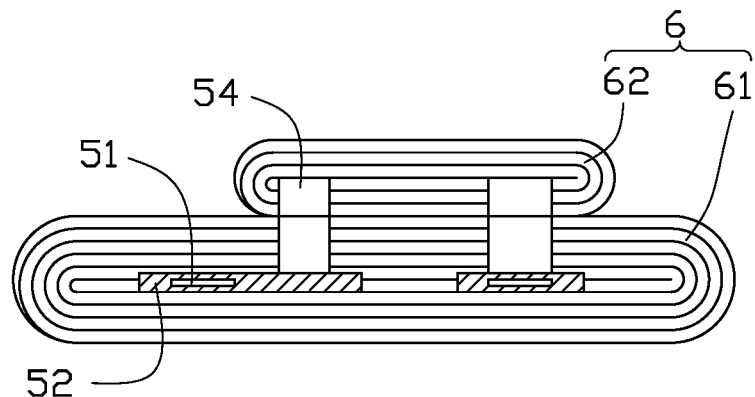
FIG. 9A
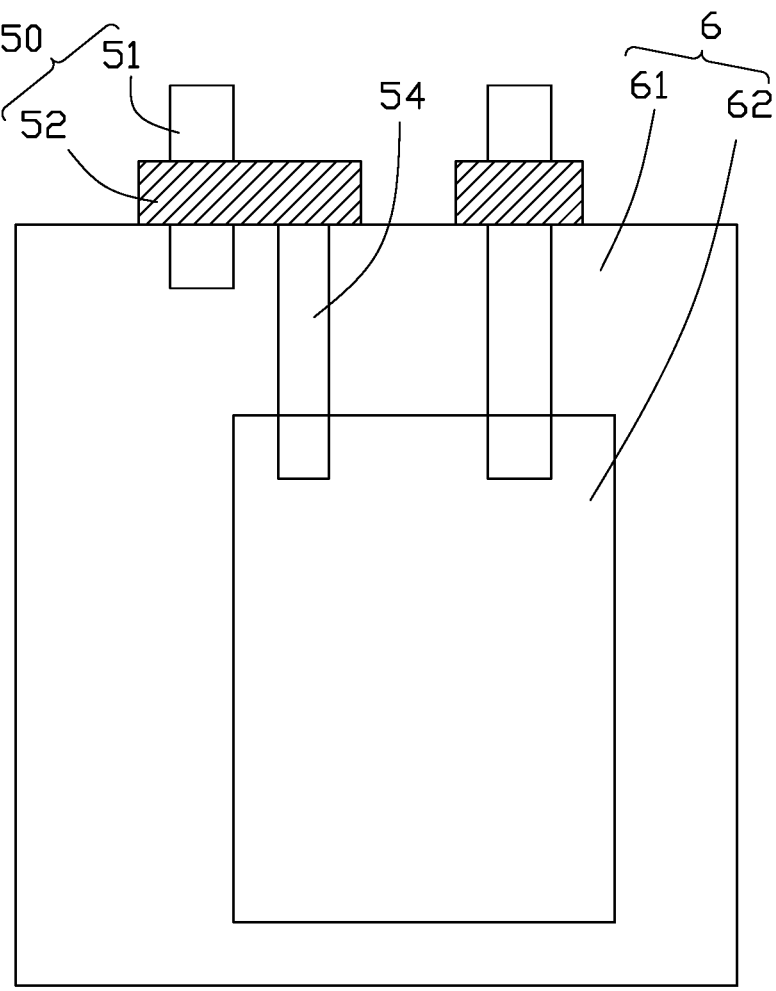
FIG. 9B
FIG. 9C

LAYER-BUILT TAB, ELECTRODE PLATE, BATTERY CORE, AND BATTERY USING SAME

CROSS REFERENCE TO RELATED APPLICATIONS

This application is a continuation of International Patent Application No. PCT/CN2020/078847, filed on Mar. 11, 2020, which claims the benefit of priority from the Chinese Patent Application No. 201921155055.4, filed on Jul. 22, 2019. The entire contents of the aforementioned patent applications are incorporated herein by reference.

TECHNICAL FIELD

The subject matter of the present disclosure relates to the field of batteries, and more particularly to a layer-built tab, and an electrode plate, a battery core and a battery having the layer-built tab.

BACKGROUND

A tab of a soft-package lithium-ion battery is a single solid metal sheet. The single metal sheet has the advantages of having simple manufacturing process and low cost. However, in high-current batteries, in order to meet the current-carrying requirements of the high-capacity batteries, the thickness of the tabs needs to be increased, and excessively thick tabs increase the difficulty of welding, bending, and other processes in battery manufacturing. A thick and solid tab retains more heat, and failure to dissipate heat in a timely manner affects battery performance and even causes overheating.

SUMMARY

A layer-built tab with easy processing and good heat dissipation performance is disclosed, together with an electrode plate, a battery core, and a battery having the layer-built tab.

The present disclosure provides a layer-built tab including adhesives and a plurality of metal pieces, the plurality of metal pieces are stacked together, and connected by the adhesives.

The present disclosure further provides an electrode plate including a current collector, an active material layer, and a layer-built tab, the layer-built tab is positioned on the current collector. The layer-built tab includes adhesives and a plurality of metal pieces, the plurality of metal pieces are stacked together, and connected by the adhesives.

The present disclosure further provides a battery core, the battery core includes a first electrode plate, a second electrode plate, and an isolation film; at least one of the first electrode plate or the second electrode plate includes a layer-built tab. The layer-built tab includes adhesives and a plurality of metal pieces, the plurality of metal pieces are stacked together, and connected by the adhesives.

The present disclosure further provides a battery, the battery includes a packaging case and an electrolyte. The battery further includes a battery core. The electrolyte and the battery core are positioned within the packaging case. The battery core includes a first electrode plate, a second electrode plate, and an isolation film; at least one of the first electrode plate or the second electrode plate includes a layer-built tab. The layer-built tab includes adhesives and a plurality of metal pieces, the plurality of metal pieces are stacked together, and connected by the adhesives.

BRIEF DESCRIPTION OF THE DRAWINGS

Implementations of the present disclosure will now be described, by way of embodiments, with reference to the attached figures.

FIG. 1A is a plan view of the layer-built tab, FIG. 1B is a side view of the layer-built tab, and FIG. 1C is a front view of the layer-built tab;

FIG. 2A is a plan view of the layer-built tab, FIG. 2B is a side view of the layer-built tab, and FIG. 2C is a front view of the layer-built tab;

FIG. 3A is a plan view of the layer-built tab, FIG. 3B is a side view of the layer-built tab, and FIG. 3C is a front view of the layer-built tab;

FIG. 4A is a plan view of the battery assembly, FIG. 4B is a side view of the battery assembly, and FIG. 4C is a front view of the battery assembly;

FIG. 7A is a plan view of the layer-built tab, FIG. 7B is a side view of the layer-built tab, and FIG. 7C is a front view of the layer-built tab;

FIG. 8A is a plan view of the layer-built tab, FIG. 8B is a side view of the layer-built tab, and FIG. 8C is a front view of the layer-built tab;

FIGS. 9A-9C are schematic structural diagrams of a battery assembly having the layer-built tab of FIGS. 8A-8C, FIG. 9A is a plan view of the battery assembly, FIG. 9B is a side view of the battery assembly, and FIG. 9C is a front view of the battery assembly.

Figure 1A:
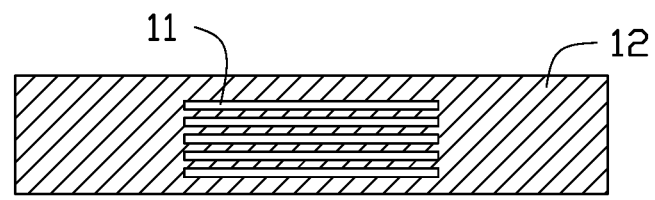
FIGS. 1A-1C are schematic structural diagrams of the layer-built tab according to a first embodiment.

Signs of main components:
layer-built tab: 10, 20, 30, 40, 50
metal pieces: 11, 21,31
adhesive: 12, 22, 32, 42, 52
through holes: 23, 33, 43, 53
first metal piece: 41,51
second metal piece: 44,54
battery: 400
battery core: 401,6
packaging case: 402
first battery core: 61
second battery core: 62
current collector: 70

DETAILED DESCRIPTION

For simplicity and clarity of illustration, where appropriate, same reference numerals have been used among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

First Embodiment

Figures 1B, 1C:
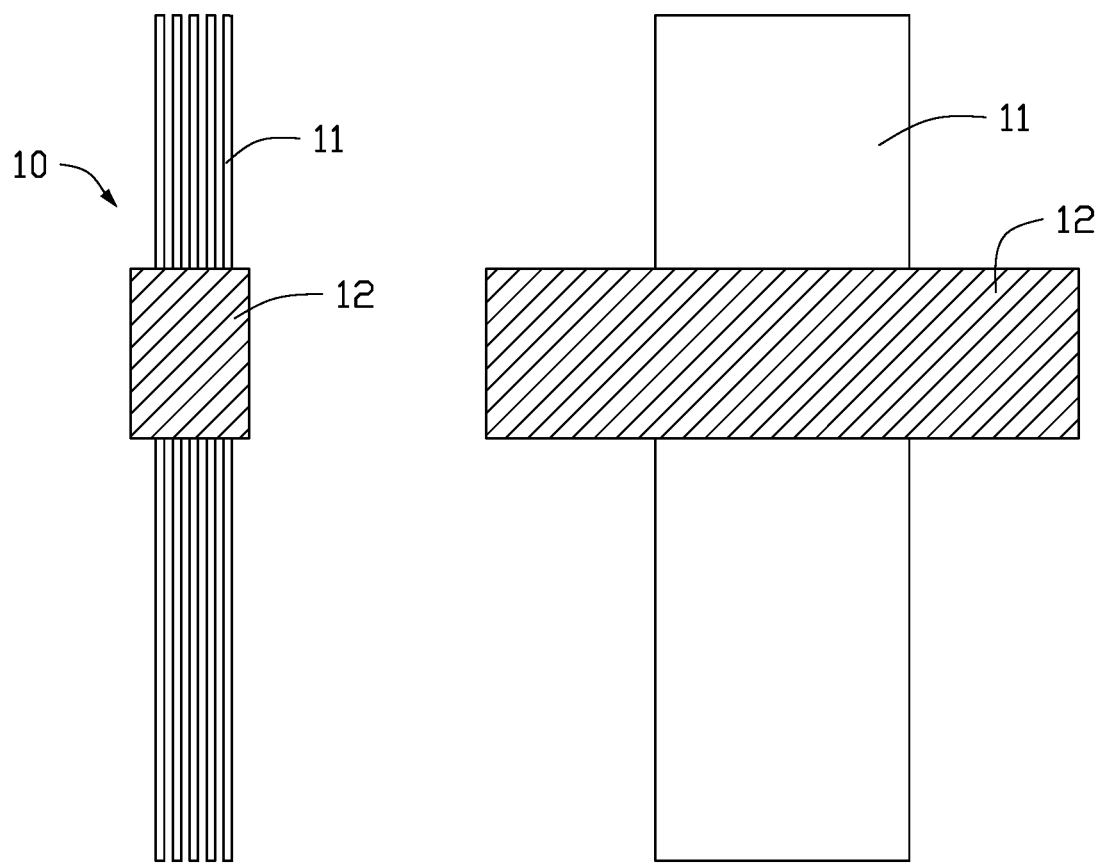

Referring to FIGS. 1A-1C, a layer-built tab 10 includes a plurality of metal pieces 11 arranged in a stack and adhesives 12 for bonding the metal pieces 11. The metal piece 11 is, but not limited to, substantially rectangular. In other embodiments, the metal sheet 11 may be of other shapes. The adhesive 12 is positioned on the side of the metal piece 11. An adhesive 12 is provided between adjacent metal pieces 11, and the metal pieces 11 are adhered by the adhesive 12, so that the metal pieces 11 are kept relatively fixed and spaced apart from each other. Therefore, the heat dissipation area of the layer-built tab 10 is increased, and the heat generated by the layer-built 10 can be quickly dissipated when there is airflow between the metal pieces 11. Heat dissipation capability of the layer-built tab 10 is effectively improved.

The adhesives 12 may be hot-melt adhesive sheets, and the adhesives 12 are positioned on the sides of adjacent metal pieces 11. The metal pieces 11 are adhered by the adhesive 12 by means of pressure and heat fusion. The adhesive 12 covers substantially a middle region of the metal piece 11 and surrounds the middle peripheral side of the metal pieces 11.

In another embodiment, the metal pieces 11 may be set in a specific mold, and the adhesive 12 is poured on the plurality of the metal pieces 11.

Second Embodiment

Figures 2A, 2B, 2C:
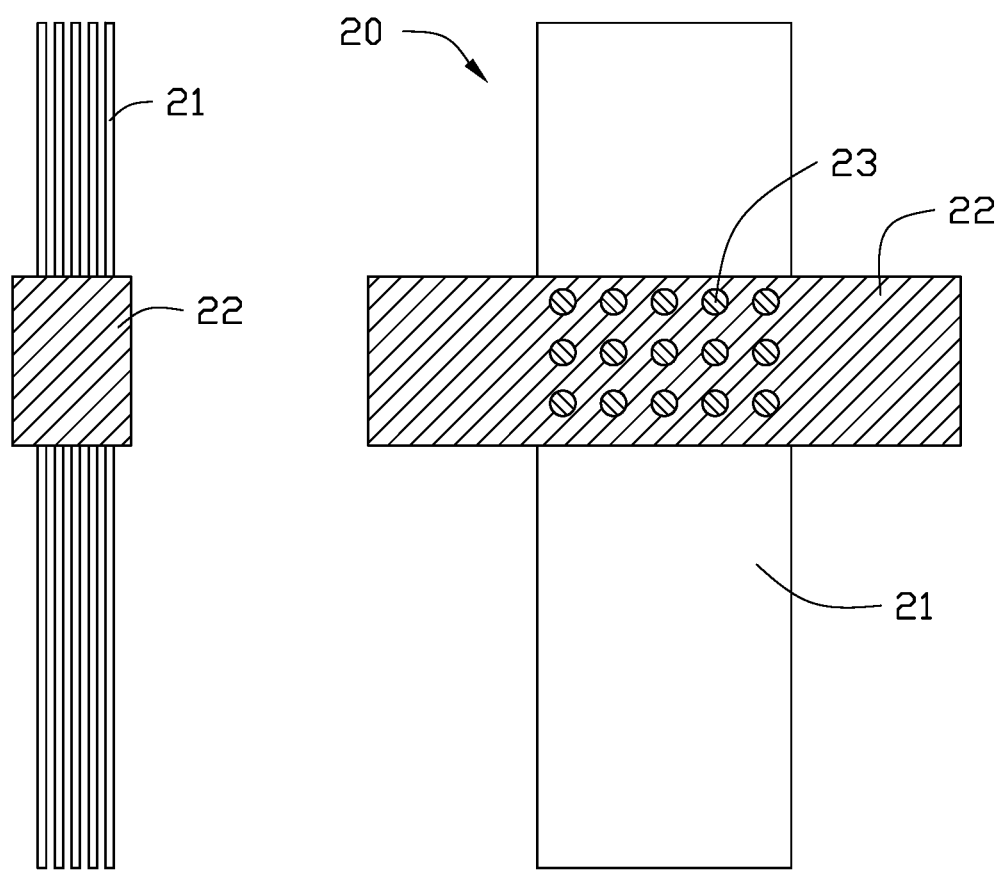
FIGS. 2A-2C are schematic structural diagrams of the layer-built tab according to a second embodiment.
Figure 3A:
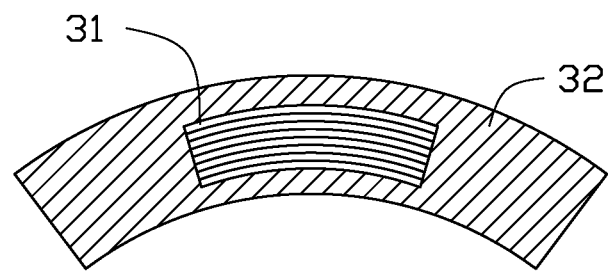
FIGS. 3A-3C are schematic structural diagrams of the layer-built tab according to a third embodiment.
Figures 3B, 3C:
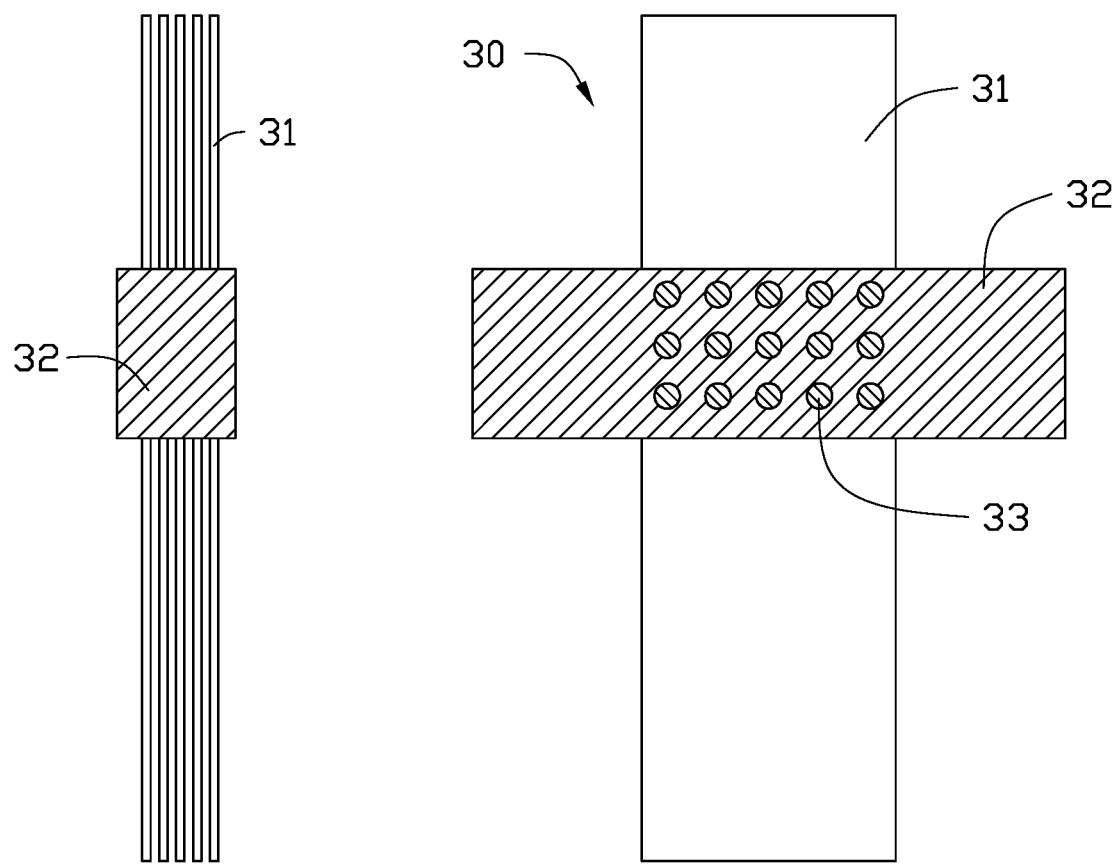

Referring to FIGS. 2A-2C, the layer-built tab 20 of the second embodiment is substantially the same as the layer-built tab 10 of the first embodiment. The difference is that a plurality of through holes 23 are formed on the metal pieces 21 of the second embodiment. The through holes 23 are substantially located in the middle portion of each metal piece 21. The adhesive 22 covers the positions where the through holes 23 are located, and the plurality of through holes 23 are filled with the adhesive 22, so that the adhesives 22 between and through the metal pieces 21 are connected to form a single body, providing a strong connection between the metal pieces 21.

In another embodiment, a through hole is provided on each alternate metal piece 21 in the plurality of metal pieces, the through holes are filled with the adhesives 22, and the adhesive between and through the alternate metal pieces 21 are connected to form a single body. Furthermore, the metal pieces 21 provided with through holes and the metal pieces 21 without through holes are alternately stacked, or only some of the metal pieces 21 are defined with through holes, thereby reducing the strength-reducing effect of the through holes 23 and increasing and the conductive performance of the layer-built tab 20.

Third Embodiment

Referring to FIGS. 3A-3C and 4A-4C, the layer-built tab 30 of the third embodiment is substantially the same as the layer-built tab 20 of the second embodiment. The difference is that the metal pieces 31 of the third embodiment have an arc-shaped structure, to fit a battery core 401 having a substantially fan-shaped cross section. In other embodiments, there may be multiple shapes and structures of the metal pieces 31, to match with different types of the battery core 401. When stacking the metal pieces 31, through holes 33 are defined on each metal piece 31, and then the metal piece 31 is placed in a fixture to receive a bending pretreatment according to predetermined requirements, so that the shape and structure of the metal piece 31 can be matched with the battery core 401. Curved metal pieces 31 are stacked together, and are bonded and fixed by the adhesive 32 to form a layer-built tab 30.

In another embodiment, the metal piece 31 possesses no through holes 33, and the metal pieces 31 may be directly bent and stacked together.

Figure 4A:
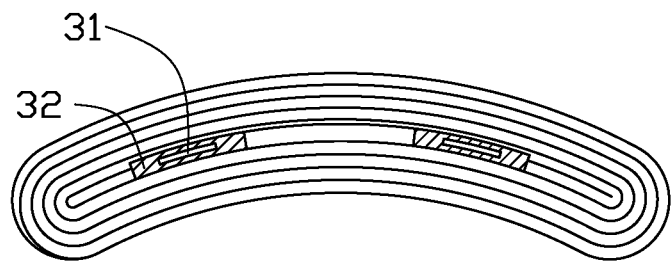
FIGS. 4A-4C are schematic structural diagrams of a battery assembly having the layer-built tab of FIGS. 3A-3C.
Figures 4B, 4C:
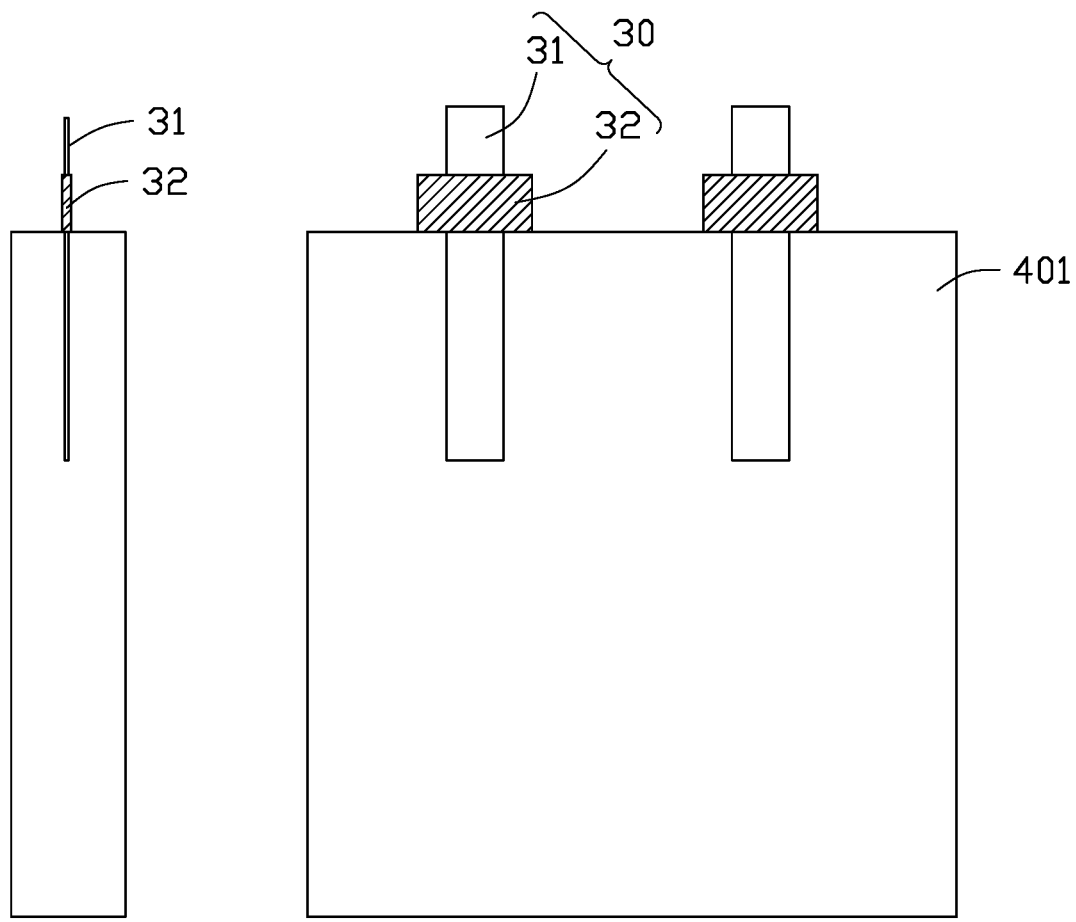
Figure 5:
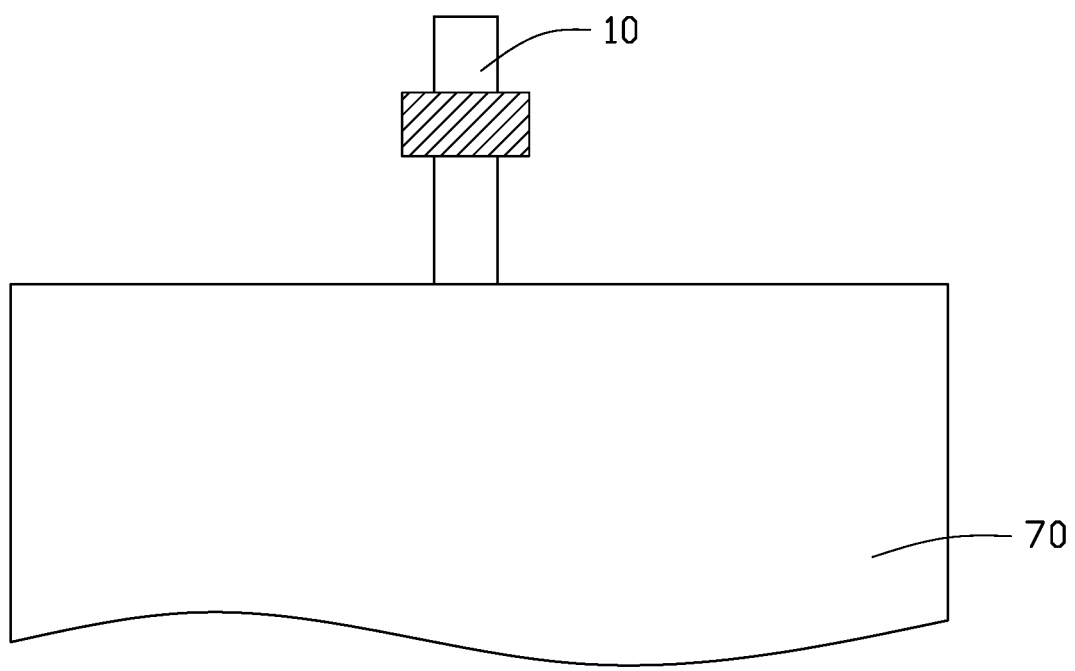
FIG. 5 is a schematic structural diagram of an electrode plate having the layer-built tab of FIGS. 3A-3C.
Figure 6:
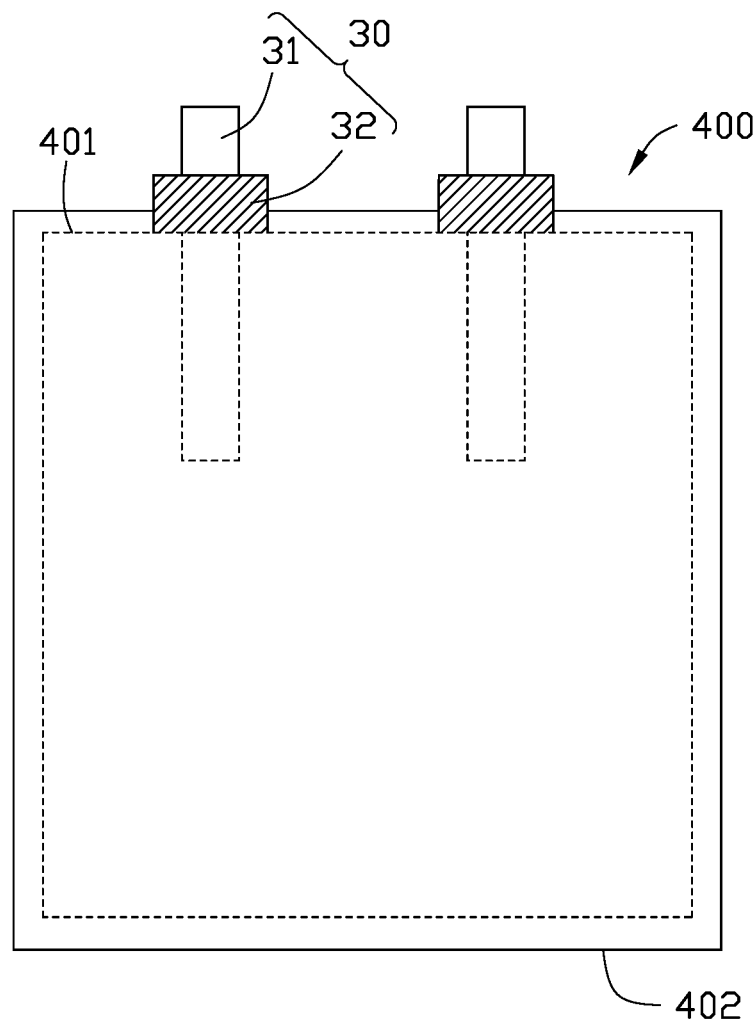
FIG. 6 is a schematic structural diagram of a battery having the battery assembly of FIG. 4A-4C.

A battery assembly shown in FIGS. 4A-4C includes the battery core 401. The battery core 401 has an arc-shaped structure, and its cross section is approximately fan-shaped. The shape and radian of the metal piece 31 and the battery core 401 are matched. The battery core 401 is formed by winding or stacking a first electrode plate and a second electrode plate with opposite polarities. The two layer-built tabs 30 arranged in opposite polarities are respectively connected to the first electrode plate and the second electrode plate. The connecting structure of the layer-built tab 30 and the electrode plate is shown in FIG. 5. The electrode plate includes a current collector 70. The layer-built tab 30 is connected to one side of the current collector 70. After the electrode plate is assembled to form the battery core 401, the layer-built tab 30 is partially positioned in the battery core 401. Referring to FIG. 6, the battery core 401 can be packed into a packaging case 402 to manufacture a battery 400. The layer-built tab 30 extends out of the packaging case 402, and the adhesives 32 are positioned at interfaces between the layer-built tab 30 and the packaging case 402, to seal the packaging case 402. The packaging case 402 is defined with a liquid injection port when the battery core 401 is sealed, and the electrolyte flows into the packaging case 402 through the liquid injection port. The battery may be, but is not limited to, a lithium ion battery.

Fourth Embodiment

Figure 7A:
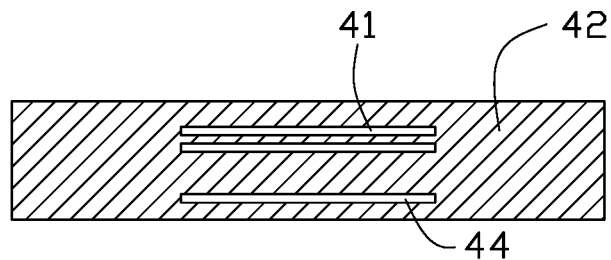
FIGS. 7A-7C are schematic structural diagrams of the layer-built tab according to a fourth embodiment.
Figure 7B:
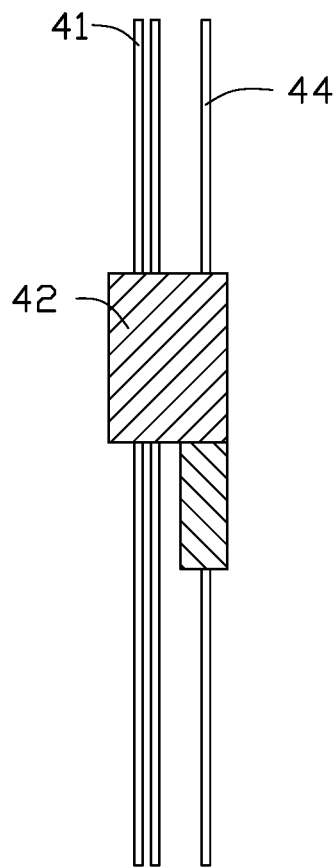
Figure 7C:
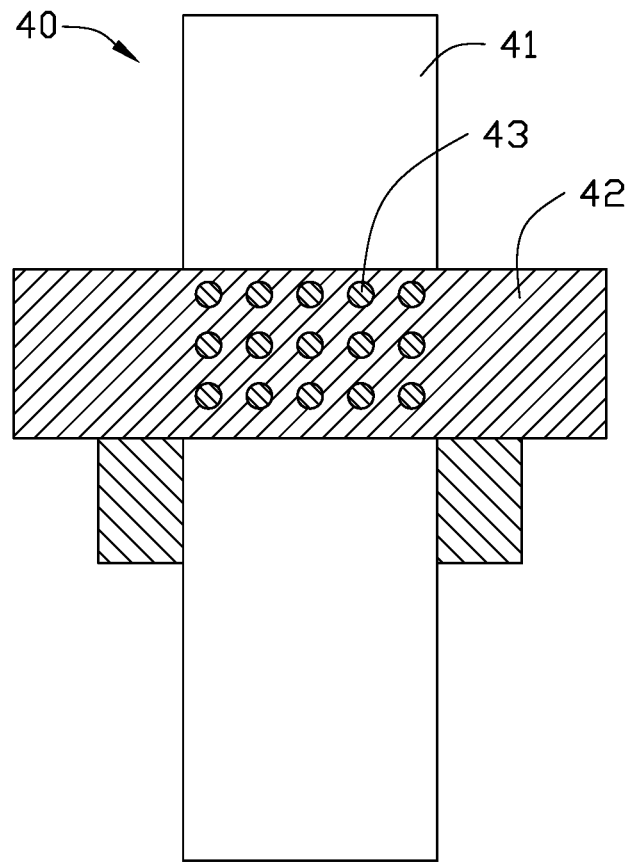
Figure 8A:
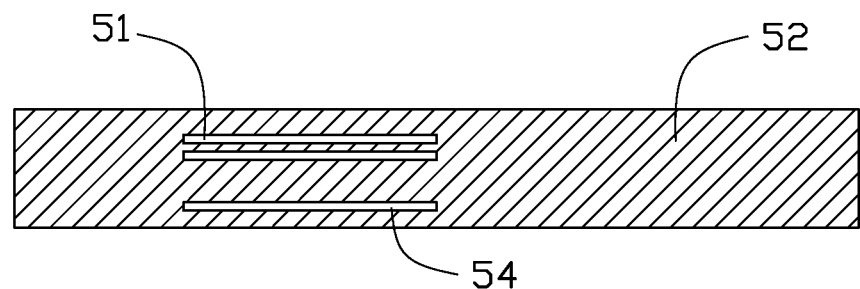
FIGS. 8A-8C are schematic structural diagrams of the layer-built tab according to a fifth embodiment.
Figures 8B, 8C:
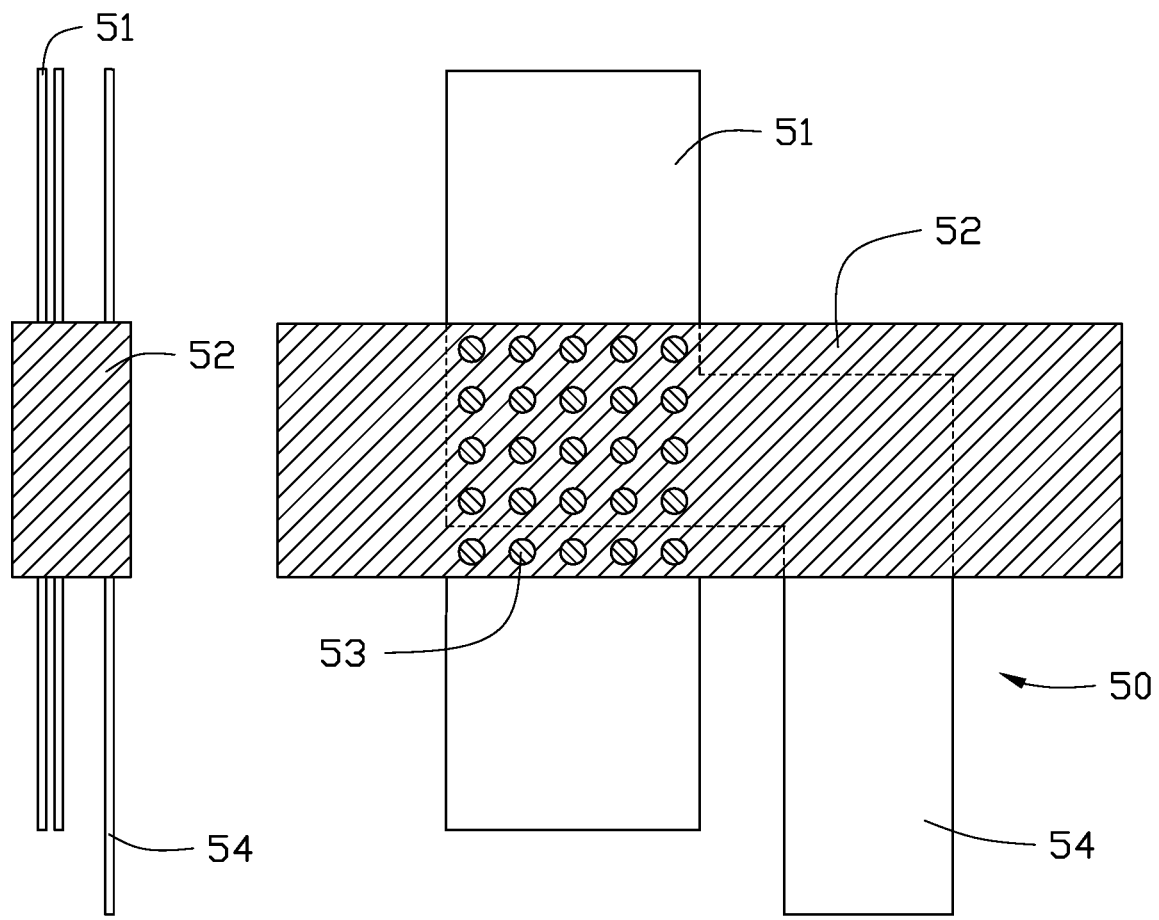

Referring to FIGS. 7A-7C, the layer-built tab 40 of the fourth embodiment is substantially the same as the layer-built tab 20 of the second embodiment, except that the layer-built tab 40 includes a plurality of first metal pieces 41 and a plurality of second metal pieces 44. The minimum distance between the first metal pieces 41 and the second metal pieces 44 is different from the minimum distance between two adjacent first metal pieces 41. The adhesive 42 positioned on the second metal piece 44 extends along the length of the second metal piece 44, so that the adhesive 42 on the second metal piece 44 extends downward for a distance as shown in FIG. 7B. Thereby, the second metal piece 44 is strengthened, and the mechanical strength of the second metal piece 44 is enhanced, avoiding deformation of the second metal piece 44. The extended length of the adhesive 12 can be set or calculated according to actual needs. In the fourth embodiment, the shapes of the first metal sheet 41 and of the second metal piece 44 are the same, the different distances between the first metal pieces 41 and the second metal pieces 44 are for connecting battery cores with various sizes.

Fifth Embodiment

Referring to FIGS. 8A-8C and 9A-9C, the layer-built tab 50 of the fifth embodiment is substantially the same as the layer-built tab 40 of the fourth embodiment, except that the first metal piece 51 and the second metal piece 54 of the layer-built tab 50 have different shapes. The layer-built tab 50 is suitable for connecting to a battery core 6 having a stepped structure.

The first metal piece 51 is substantially rectangular, and the second metal piece 54 is substantially Z-shaped. The first metal piece 51 and the second metal piece 54 are partially stacked and are spaced apart from each other. Specifically, one end of the first metal piece 51 and one end of the second metal piece 54 are stacked, and other end of the first metal piece 51 and of the second metal pieces 54 are staggered by a middle lateral portion of the "Z" structure.

The battery assembly shown in FIGS. 9A-9C includes the layer-built tabs 50 and the battery core 6. The battery core 6 includes a first battery core 61 and a second battery core 62 arranged in a stepped manner. The size of the second battery core 62 is smaller than that of the first battery core 61, and the second battery core 62 is positioned on a side surface of the first battery core 61. The first metal pieces 51 of the layer-built tab 50 are connected to the first battery core 61, and the second metal pieces 54 of the layer-built tab 50 are connected to the second battery core 62. A portion of the second metal piece 54 extends out from the second battery core 62 and is located under the adhesive 52. Such portion is bent along the shape of the surface of the battery core 6 and is adhered to the outer surface of the battery core 6. The battery assembly shown in FIGS. 9A-9C may include two layer-built tabs 50, or may include one layer-built tab 50 and one layer-built tab 40. The first metal piece 41 and the second metal piece 44 of the layer-built tab 40 are respectively connected to the first battery core 61 and the second battery core 62. Since each metal piece 41 is thin and can be easily processed into various shapes, the layer-built tab can be selected or customized according to the actual shape of the battery core 6. The present disclosure does not limit the shape and structure of any metal piece or sheet.

Compared with the conventional single-piece thick tab, the layer-built tab of the present disclosure has the advantages of convenient processing and installation, and can be made to match batteries of different sizes. The metal pieces or sheets are stacked and spaced apart from each other, which increases the heat dissipation area of the tab while supporting large currents, effectively improves the heat dissipation capacity of the tab, and reduces damage caused by high temperatures.

The present disclosure further provides an electrode plate. Referring to FIG. 5, the electrode plate includes a current collector 70 and an active material layer disposed on the current collector 70. The electrode plate further includes a layer-built tab of any one of the foregoing embodiments or combinations of embodiments. The layer-built tab is arranged in a region where the current collector 70 is not provided with the active material layer. A plurality of the layer-built tabs can be positioned on the electrode plate.

The present application further provides an electric core, which includes a first electrode plate, a second electrode plate, and an isolation film. The polarities of the first electrode plate and of the second electrode plate are opposite, and the isolation film is positioned between the first electrode plate and the second electrode plate. At least one of the first electrode plate and the second electrode plate is an electrode plate having a layer-built tab as described above.

The present disclosure further provides a battery, which includes a packaging case, an electrolyte, and the battery core having the layer-built tabs. The electrolyte and the battery core are positioned in the packaging case.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A layer-built tab, comprising:
    a plurality of metal pieces; and
    adhesives arranged between adjacent metal pieces;
    wherein
        the plurality of metal pieces are stacked, and adhered by the adhesives;
        a through hole is provided on each alternate metal piece in the plurality of metal pieces; and
        the through holes are filled with the adhesives, and the adhesive between and through the alternate metal pieces are connected to form a single body;
        wherein the plurality of metal pieces comprises first metal pieces and second metal pieces,
        the first metal pieces and the second metal pieces have same polarity;
        the first metal pieces are stacked in a stacking direction;
        each second metal piece is partially stacked with the first metal pieces in the stacking direction;
        the second metal pieces and the first metal pieces are spaced apart from each other;
        wherein a minimum distance between the first metal pieces and the second metal pieces in the stacking direction is greater than a minimum distance between adjacent first metal pieces in the stacking direction.

2. The layer-built tab of claim 1, wherein the plurality of metal pieces have an arc-shaped structure.

3. An electrode plate, comprising:
    a current collector;
    an active material layer; and
    a layer-built tab,
    wherein the layer-built tab comprises:
        a plurality of metal pieces, and
        adhesives arranged between adjacent metal pieces,
    wherein the plurality of metal pieces are stacked, and adhered by the adhesives;
        a through hole is provided on each alternate metal piece in the plurality of metal pieces;
        the through holes are filled with the adhesives, and the adhesives between and through the alternate metal pieces are connected to form a single body; and
        the layer-built tab is positioned on the current collector;
        wherein the plurality of metal pieces comprises first metal pieces and second metal pieces, the first metal pieces and the second metal pieces have same polarity;
        the first metal pieces are stacked in a stacking direction;
        each second metal piece is partially stacked with the first metal pieces in the stacking direction;
        the second metal pieces and the first metal pieces are spaced apart from each other;

wherein a minimum distance between the first metal pieces and the second metal pieces in the stacking direction is greater than a minimum distance between adjacent first metal pieces in the stacking direction.

4. The electrode plate of claim 3, wherein a plurality of the layer-built tabs are positioned on the electrode plate.

5. A battery core, comprising:
a first electrode plate;
a second electrode plate; and
an isolation film;
wherein at least one of the first electrode plate and the second electrode plate comprises a layer-built tab,
wherein the layer-built tab comprises:
a plurality of metal pieces; and
adhesives arranged between adjacent metal pieces,
wherein the plurality of metal pieces are stacked, and adhered by the adhesives;
a through hole is provided on each alternate metal piece in the plurality of metal pieces; and
the through holes are filled with the adhesives, and the adhesives between and through the alternate metal pieces are connected to form a single body;
wherein the plurality of metal pieces comprises first metal pieces and second metal pieces, the first metal pieces and the second metal pieces have same polarity;
the first metal pieces are stacked in a stacking direction;
each second metal piece is partially stacked with the first metal pieces in the stacking direction;
the second metal pieces and the first metal pieces are spaced apart from each other;
wherein a minimum distance between the first metal pieces and the second metal pieces in the stacking direction is greater than a minimum distance between adjacent first metal pieces in the stacking direction.

6. The battery core of claim 5, wherein the battery core has an arc-shaped structure.

7. The battery core of claim 5, wherein the battery core comprises a first battery core and a second battery core arranged in a stepped manner.

8. The battery core of claim 7, wherein the size of the second battery core is smaller than that of the first battery core.

9. The battery core of claim 8, wherein the second battery core is positioned on a side surface of the first battery core.

10. The battery core of claim 5, wherein the first metal pieces of a layer-built tab are connected to a first battery core of the battery core, and the second metal pieces of a layer-built tab are connected to a second battery core of the battery core; wherein a portion of the second metal piece extends out from the second battery core and is located under the adhesive, the portion of the second metal piece is bent along the shape of the surface of the battery core and is adhered to the outer surface of the battery core.

11. A battery, comprising:
a packaging case;
an electrolyte; and
a battery core,
wherein the battery core comprises:
a first electrode plate:
a second electrode plate; and
an isolation film:
wherein at least one of the first electrode plate and the second electrode plate comprises a layer-built tab;
wherein the layer-built tab comprises:
a plurality of metal pieces; and
adhesives arranged between adjacent metal pieces;
wherein
the plurality of metal pieces are stacked, and adhered by the adhesives;
a through hole is provided on each alternate metal piece in the plurality of metal pieces; and
the through holes are filled with the adhesives, and the adhesives between and through the alternate metal pieces are connected to form a single body; and
wherein the electrolyte and the battery core are positioned in the packaging case;
wherein the plurality of metal pieces comprises first metal pieces and second metal pieces, the first metal pieces and the second metal pieces have same polarity;
the first metal pieces are stacked in a stacking direction;
each second metal piece is partially stacked with the first metal pieces in the stacking direction;
the second metal pieces and the first metal pieces are spaced apart from each other;
wherein a minimum distance between the first metal pieces and the second metal pieces in the stacking direction is greater than a minimum distance between adjacent first metal pieces in the stacking direction.

12. The battery of claim 11, wherein
the layer-built tab of the battery core is extended out from the packaging case;
the adhesives are also provided at interfaces between the layer-built tab and the packaging case; and
the adhesives are configured for sealing the packaging case.

13. The layer-built tab of claim 1, wherein each first metal piece is rectangular, and the each second metal piece is a Z-shaped structure.

14. The layer-built tab of claim 13, wherein one end of the each first metal piece and one end of the each second metal piece are stacked, and other end of the each first metal piece and other end of the each second metal pieces are staggered by a middle lateral portion of the Z-shaped structure.

* * * * *